(12) United States Patent
Seo et al.

(10) Patent No.: US 7,555,717 B2
(45) Date of Patent: Jun. 30, 2009

(54) METHOD FOR DISPLAYING SCREEN IMAGE ON MOBILE TERMINAL

(75) Inventors: Jeong-Wook Seo, Daegu (KR); Jae-Ho Kim, Gumi-si (KR); Eun-Jung Seo, Busan (KR); Yang-Hyun Lee, Gumi-si (KR); Hae-Young Park, Gumi-si (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/117,718

(22) Filed: Apr. 29, 2005

(65) Prior Publication Data

US 2005/0280660 A1 Dec. 22, 2005

(30) Foreign Application Priority Data

Apr. 30, 2004 (KR) ............. 10-2004-0030642
Apr. 30, 2004 (KR) ............. 10-2004-0030643

(51) Int. Cl.
*G06F 3/048* (2006.01)
(52) U.S. Cl. .................... 715/706; 345/440
(58) Field of Classification Search .............. None
See application file for complete search history.

(56) References Cited

U.S. PATENT DOCUMENTS

| | | | | | |
|---|---|---|---|---|---|
| 5,896,133 | A  * | 4/1999 | Lynch et al. | ........ | 715/784 |
| 6,546,263 | B1 * | 4/2003 | Petty et al. | ........ | 455/566 |
| 6,614,435 | B1 * | 9/2003 | Tsujimoto | ........ | 345/473 |
| 6,792,406 | B1 * | 9/2004 | Fujimura et al. | ........ | 704/257 |
| 7,003,040 | B2 * | 2/2006 | Yi | ........ | 375/240.24 |
| 2001/0023405 | A1 * | 9/2001 | Nagisa | ........ | 705/10 |
| 2002/0095467 | A1 * | 7/2002 | Hachiya et al. | ........ | 709/206 |
| 2003/0115240 | A1 * | 6/2003 | Cho | ........ | 709/102 |
| 2003/0115254 | A1 * | 6/2003 | Suzuki | ........ | 709/202 |
| 2003/0117485 | A1 * | 6/2003 | Mochizuki et al. | ........ | 348/14.01 |

(Continued)

FOREIGN PATENT DOCUMENTS

EP 0-855-823 A2 7/1998

(Continued)

OTHER PUBLICATIONS

Author: Paul McFedries, Title: The Complete Idiot's Guide to Microsoft Windows 2000 Professional, Date: Jan. 2000, Publisher: Que, Pertinent pp. 31-32.*

*Primary Examiner*—Kee M Tung
*Assistant Examiner*—David H Chu
(74) *Attorney, Agent, or Firm*—Roylance, Abrams, Berdo and Goodman, LLP

(57) ABSTRACT

A mobile terminal that is capable of displaying a screen image during a specific state, which includes a character memory for storing character images and a screen image created by a combination of the character images and which is displayable during the specific state of the mobile terminal. The mobile terminal further includes a controller for controlling the display of the screen image, and a display unit for displaying the screen image. When an event occurs in the mobile terminal, the controller further processes the event and changes the display data of the screen image according to the event processing result, and displays the changed screen image during the specific state of the mobile terminal.

22 Claims, 18 Drawing Sheets

U.S. PATENT DOCUMENTS

| | | | |
|---|---|---|---|
| 2003/0179204 A1* | 9/2003 | Mochizuki et al. | 345/473 |
| 2004/0060067 A1 | 3/2004 | Yi | |
| 2004/0172172 A1* | 9/2004 | Kubota et al. | 701/1 |
| 2004/0179038 A1* | 9/2004 | Blattner et al. | 345/751 |
| 2005/0020316 A1* | 1/2005 | Mahini | 455/566 |
| 2005/0044500 A1* | 2/2005 | Orimoto et al. | 715/706 |
| 2005/0054381 A1* | 3/2005 | Lee et al. | 455/557 |
| 2005/0111631 A1* | 5/2005 | Jordan | 379/88.12 |
| 2005/0190188 A1* | 9/2005 | Anzawa et al. | 345/474 |
| 2005/0223328 A1* | 10/2005 | Ashtekar et al. | 715/706 |

FOREIGN PATENT DOCUMENTS

| | | |
|---|---|---|
| KR | 10-2004-0014762 A | 2/2004 |
| WO | WO 02/100121 A2 | 12/2002 |

\* cited by examiner

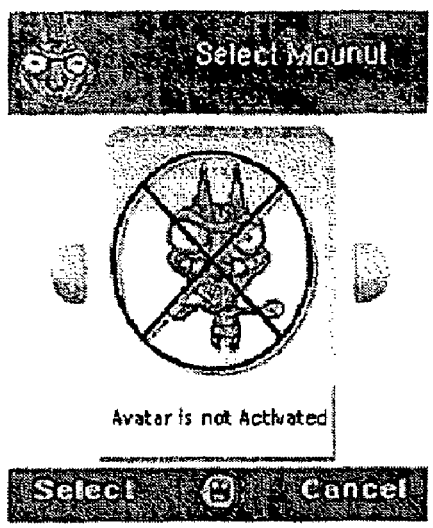 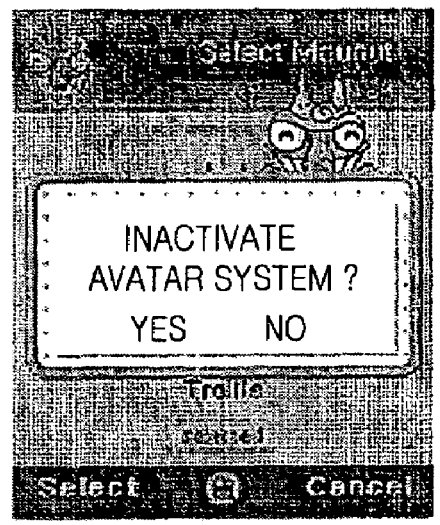
FIG.4F  FIG.4G
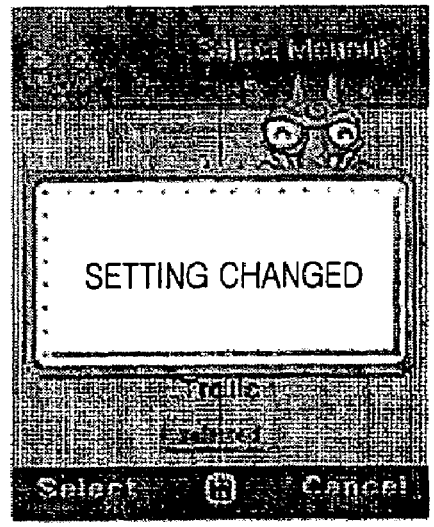
FIG.4H

USER CAN MOVE AVATAR TO A
FAVORITE POSITION WITH
LEFT/RIGHT/UP/DOWN ARROW KEYS

FOR FINISHING MOVING-MODE,
USER PRESS "OK" KEY

THE CATEGORY OF ITEM ARE FURNITURE, PETS AND SMALL-THINGS

THE WAY OF MOVING AVATAR & ITEM ARE THE SAME

METHOD FOR DISPLAYING SCREEN IMAGE ON MOBILE TERMINAL

CROSS-REFERENCE TO RELATED APPLICATIONS

This application claims the benefit under 35 U.S.C. §119(a) of Korean Patent Application No. 10-2004-0030642 entitled "Method For Displaying Screen Image In Mobile Terminal" filed in the Korean Intellectual Property Office on Apr. 30, 2004, and Korean Patent Application No. 10-2004-0030643 filed in the Korean Intellectual Property Office on Apr. 30, 2004, the entire disclosures of which are incorporated herein by reference.

BACKGROUND OF THE INVENTION

1. Field of the Invention

The present invention relates to a method for displaying a screen image on a mobile terminal. More particularly, the present invention relates to a method for setting and displaying a screen image in an idle state of a mobile terminal.

2. Description of the Related Art

Generally, "mobile terminals" refer to mobile phones or handheld devices used for wireless communications. Mobile terminals are becoming more integrated than pre-existing ones, which provided a simple telephone function, to now perform various additional functions. Recently, camcorder phones equipped with a camera, TV phones with a TV receiver, digital TV phones (DMB or DVB phones) and MP3 phones capable of processing MP3 music files have gained popularity with their additional functions. To meet the increasing demand for such additional functions, recently launched mobile terminals are capable of processing multimedia data.

Recent mobile terminals generally include an LCD display unit to display various types of data, including data necessary to perform some basic functions and multimedia data. Various display methods have also been developed to display multimedia data on a mobile terminal. For example, while in an idle state, a mobile terminal typically displays a preset screen image on its display unit. The image displayed in the idle state can be one selected from among the images previously stored in the mobile terminal or a picture downloaded or photographed by the user. However, in conventional mobile terminals, users cannot generate a screen image for use in the idle state by a combination of desired images.

Accordingly, a need exists for a system and method for providing creative and distinctive screen images. It will be desirable to provide a method that enables a user to create a screen image for use in the idle state of a mobile terminal by providing a combination of some selected character images and that further allows the user to change the locations of the selected character images to change the screen image.

SUMMARY OF THE INVENTION

Accordingly, the present invention has been made to solve the above-mentioned and other problems occurring in the prior art, and an object of the present invention is to provide a method for creating a screen image by providing a combination of desired character images and displaying the created screen image in the idle state of a mobile terminal.

Another object of the present invention is to provide a method for selecting desired character images from a memory storing a plurality of character images and displaying the selected character images at desired locations of a screen in the idle state of a mobile terminal.

Still another object of the present invention is to provide a method for selecting desired avatar and item images from a memory storing a plurality of character images including avatar and item images and displaying the selected avatar and item images at desired locations of a screen in the idle state of a mobile terminal.

Still another object of the present invention is to provide a method for creating a screen image by providing a combination of character images and displaying the screen image in the idle state of a mobile terminal.

Still another object of the present invention is to provide a method for setting character images corresponding to a particular event and displaying the character images as a screen image when the particular event occurs in the idle state of a mobile terminal.

BRIEF DESCRIPTION OF THE DRAWINGS

The above and other objects, features and advantages of the present invention will become more apparent from the following detailed description taken in conjunction with the accompanying drawings, in which:

FIGS. 4a to 4h show a process of selecting a character image according to an embodiment of the present invention;

Throughout the drawings, like reference numerals will be understood to refer to like parts, components and structures.

DETAILED DESCRIPTION OF THE EXEMPLARY EMBODIMENTS

Hereinafter, a number of exemplary embodiments of the present invention will be described with reference to the accompanying drawings. In the following description of the present invention, a detailed description of known functions and configurations incorporated herein are omitted for clarity and conciseness.

In the following description, various particulars for character images and structures are used to enhance the general understanding of the present invention. It is apparent to those skilled in the art that the present invention can be easily carried out without such particulars or by modification of the particulars.

Figure 1:
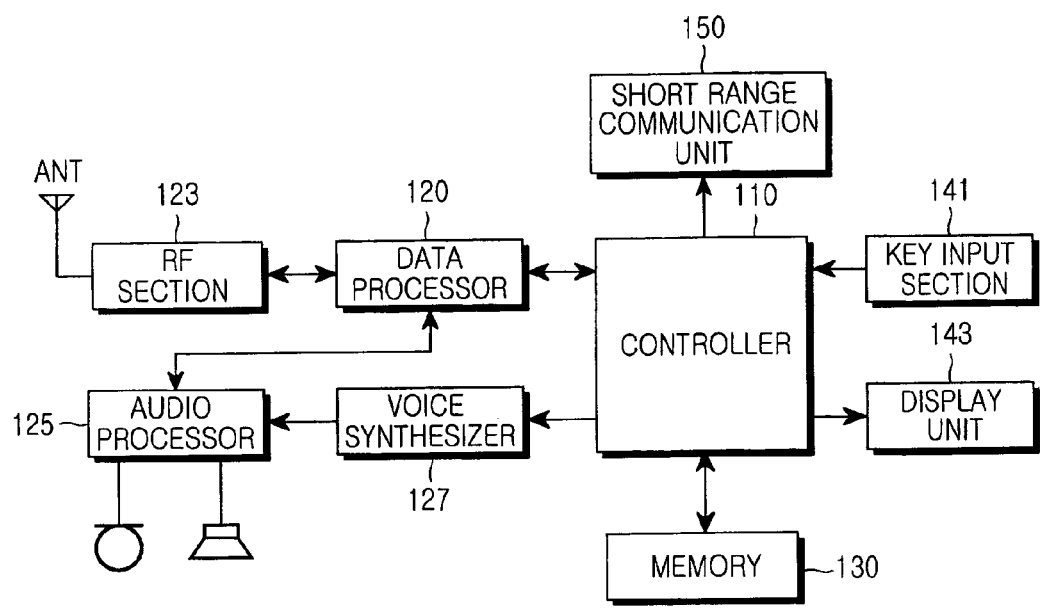
FIG. 1 is a block diagram showing a construction of a mobile terminal according to an embodiment of the present invention.

FIG. 1 illustrates the construction of a mobile terminal according to an embodiment of the present invention. The mobile terminal can be comprised of any number of devices, such as a general mobile phone.

Referring to FIG. 1, an RF section 123 performs a wireless communication function of the mobile terminal. The RF section 123 comprises a RF transmitter (not shown) for performing upward conversion and amplification of the frequency of a transmitted signal, and an RF receiver (not shown) for amplifying a received signal with low noise and performing a downward conversion of the frequency of the signal. A data processor 120 comprises a transmitter (not shown) for coding and modulating a signal which is being transmitted, and a receiver (not shown) for demodulating and decoding a signal which is being received. The data processor 120 may be comprised of a modem and a codec (not shown). A voice synthesizer 127 is provided and converts text data output from a controller 110 into a voice signal. The voice synthesizer 127 can also convert a received text message into voice.

A key input section 141 is provided with keys for inputting numbers and characters and function keys for setting up various functions.

A memory 130 may be comprised of a program memory and a data memory (not shown). The program memory includes programs for processing call signals and those for controlling the display of character images to correspond to the generated events according to an embodiment of the present invention. The data memory temporarily stores data generated during implementation of the above programs. The character image can be any of a number of images, such as an avatar, an item, a background or a combination thereof (i.e., an avatar house). An avatar is a character image used to display status information of the mobile terminal when an event occurs. An avatar house is displayed in a specific state, such as the idle state of the mobile terminal. An item is an image used to represent a specific function of the mobile terminal or to decorate the avatar house. A background image is used as a background of the avatar and the items in the avatar house. In the following description, the term "avatar house" will be used having the same meaning as "screen image", which refers to an image displayed in a specific state of the mobile terminal. In addition, the specific state can be the idle state of the mobile terminal.

The data memory includes a character memory for storing character images in accordance with an embodiment of the present invention. The character memory can consist of an avatar memory for storing avatar structures and images, an item memory for storing item structures and images, a background memory for storing background structures and images, and an avatar house memory for storing avatar house structures and images. It is possible to store only information about combinations of the avatar, item, and background images, without separately storing the avatar house structures and images.

The character memory may run as a file system. Also, each character image may have an index of the memory (or file system). The character memory may store character images classified according to the gestures, facial expressions, and items of each character (avatar). In other words, the character images can be classified according to the types of actions or reactions of each character. For example, the avatar memory for storing avatar images may consist of an avatar image memory that stores avatar images representing at least one emotion model (such as happiness, anger, sadness, embarrassment, and the like), and an emotion value memory that stores a table showing emotion values of the events processed in the mobile terminal.

The controller 110 controls the overall operations of the mobile terminal. The controller 110 may include the data processor 120. If the mobile terminal is a mobile phone, the controller 110, data processor 120 and audio processor 125, can be integrated altogether into a single MSM chip (not shown). According to an embodiment of the present invention, the controller 110 controls the operations performed to select avatar or item images, and display the selected images at desired locations in the screen image of the mobile terminal.

A display unit 143 is provided and displays the operational state of the mobile terminal under the control of the controller 110. When using an LCD, the display unit 143 may comprise an LCD controller, a memory for storing image data, and an LCD device. When the LCD is a touch screen, it can further serve as an input section.

Referring to FIG. 1, the controller 110 controls the operations for setting a screen image displayed in the idle state of the mobile terminal using avatar and item images. The user can select avatar and items from the stored images, and display the selected avatar and items at desired locations of the screen. The controller 110 changes the emotion value according to the event processed in the mobile terminal. In the idle state, the controller 110 accesses and displays an avatar emotion model corresponding to the current emotion value. As images are used to decorate the screen image displayed on the display unit 143, the items of each image can be divided into general items, and special items that are used to display special status information of the mobile terminal when a particular event occurs. The special items that can be used to inform a user of the occurrence of an event may include a mailbox item indicating the arrival of a text message, and a missed call item indicating a missed call. As the mailbox item, a mailbox image can be used to indicate the number of text messages that have not yet been opened. In addition, the missed call item can be used to indicate the number of missed calls.

Events that may occur in the mobile terminal can include any number of events, such as a system state alert, origination or receiving of a call, transmission or receiving of a text message, alarm setting or cancellation, multimedia processing, and wireless Internet access. The events are broadly divided into those increasing an emotion value and those decreasing an emotion value. Emotion values corresponding to the respective events are previously set and registered in the mobile terminal.

When an event occurs, the mobile terminal processes the event and changes the emotion value according to the event. The emotion value will be decreased if the mobile terminal is kept idle for a long time in a power-on state (in other words, if no event occurs for a long time), or if the mobile terminal is kept in power-off state for a long time.

The emotion value is increased or decreased according to the events. An avatar emotion model that varies depending on the emotion value is displayed to indicate the emotion state on the mobile terminal. In other words, as a human feels emotional changes, avatar emotion models show emotional changes that represent the changes in the state on the mobile terminal. An avatar emotion model representing the actual emotion state can be set and displayed on the mobile terminal. According to the avatar emotion display function, the emotion value is increased or decreased by an emotion variance value preset for each event of the mobile terminal, and an avatar emotion model corresponding to the current emotion value is set and displayed on the display unit. The avatar emotion models corresponding to different ranges of emotion values are stored in the avatar memory within the memory 130. Table 1 below shows an example of emotion variance values preset for events of the mobile terminal according to an embodiment of the present invention.

TABLE 1

| Application | Event | Emotion Variance Value |
|---|---|---|
| Phone Book | Addition of a contact card in Phone Book | +1 |
| | Deletion of a contact card from Phone Book | −1 |
| | Sending an SMS message | +1 |
| | Receiving an SMS message | +1 |
| Text Message | Sending an MMS message | +1 |
| | Receiving an MMS message | +1 |
| | Sending a CBM message (affirmative action) | +2 |
| | Receiving a CBM message (negative action) | −2 |
| Camera | Photographing a still image | +1 |
| | Photographing a moving image | +1 |
| | Receiving a call | +2 |
| Phone | Transmitting a call | +2 |
| | Record of a missed call | −1 |
| WAP | WAP access | +2 |
| | WAP download | +2 |
| Automatic Emotion Change | The emotion value automatically decreases while the mobile terminal is not used. | −(current emotion value/24 hours) |

The controller 110 increases or decreases the emotion value by an emotion variance value corresponding to an occurred event as shown in Table 1 and stores the changed emotion value. If necessary, the controller 110 displays an avatar emotion model corresponding to the changed emotion value. Each emotion state is represented by an emotion value which can be defined over a range, such as values within a range from 0 to 100. Further, this range of emotion value can be divided into classes, such as the following five classes representing different emotion states as shown below in Table 2.

TABLE 2

Figure 13A:
FIGS. 13a to 13g show example screen images representing different emotion states in FIG. 11 according to an embodiment of the present invention.
Figure 13B:
Figure 13C:
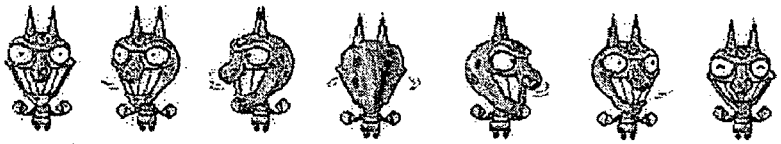
Figure 13D:
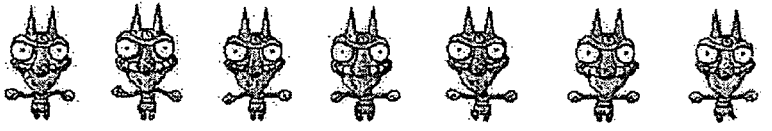
Figure 13E:
Figure 13F:
Figure 13G:

| Emotion Value Class (larger than ~ equal to or less than) | Emotion state | Emotion Model As Illustrated In |
|---|---|---|
| 0~10 | Angry | FIG. 13g |
| 10~30 | Sad | FIG. 13f |
| 30~60 | Shy | FIG. 13e |
| 60~90 | Happy | FIG. 13d |
| 90~100 | Special | FIG. 13c |

The avatar emotion model is determined based on the criterion as shown in Table 2 and according to the changed emotion value. The controller 110 can then access the determined avatar emotion model from the avatar memory within the memory 130 and display the avatar emotion model on display unit 143 as shown in FIGS. 13c to 13g.

If events with positive emotion variance values as shown in Table 2 frequently occur in the mobile terminal, the emotion value will increase to set and display an avatar emotion model expressing good emotion. However, if events with negative emotion variance values frequently occur or if no event occurs for a long time, the emotion value will decrease to set and display an avatar emotion model expressing bad emotion.

As described above, status information of the mobile terminal is displayed using an avatar emotion model. In addition, an avatar can be used in a screen image displayed in the idle state of the mobile terminal. According to an embodiment of the present invention, a screen image displayed in the idle state may be an avatar house image which is created using an avatar, item or background image, or a combination thereof. An avatar expresses the emotion state determined according to the events that have occurred in the mobile terminal. Items are comprised of general items used to decorate an avatar house and special items used to display special status information of the mobile terminal when a particular event occurs.

Hereinafter, a process of selecting an avatar and items, and of setting the selected images to display a screen image in the idle state of the mobile terminal will be explained in greater detail. In the exemplary embodiments of the present invention, the user can first select a desired avatar in the screen image setting menu and then select items for setting an avatar house which will be displayed in the idle state. The user can set or change the locations of the selected avatar and items in the screen image. Alternatively, the user can first set the locations of the avatar and items to be selected.

Figure 2:
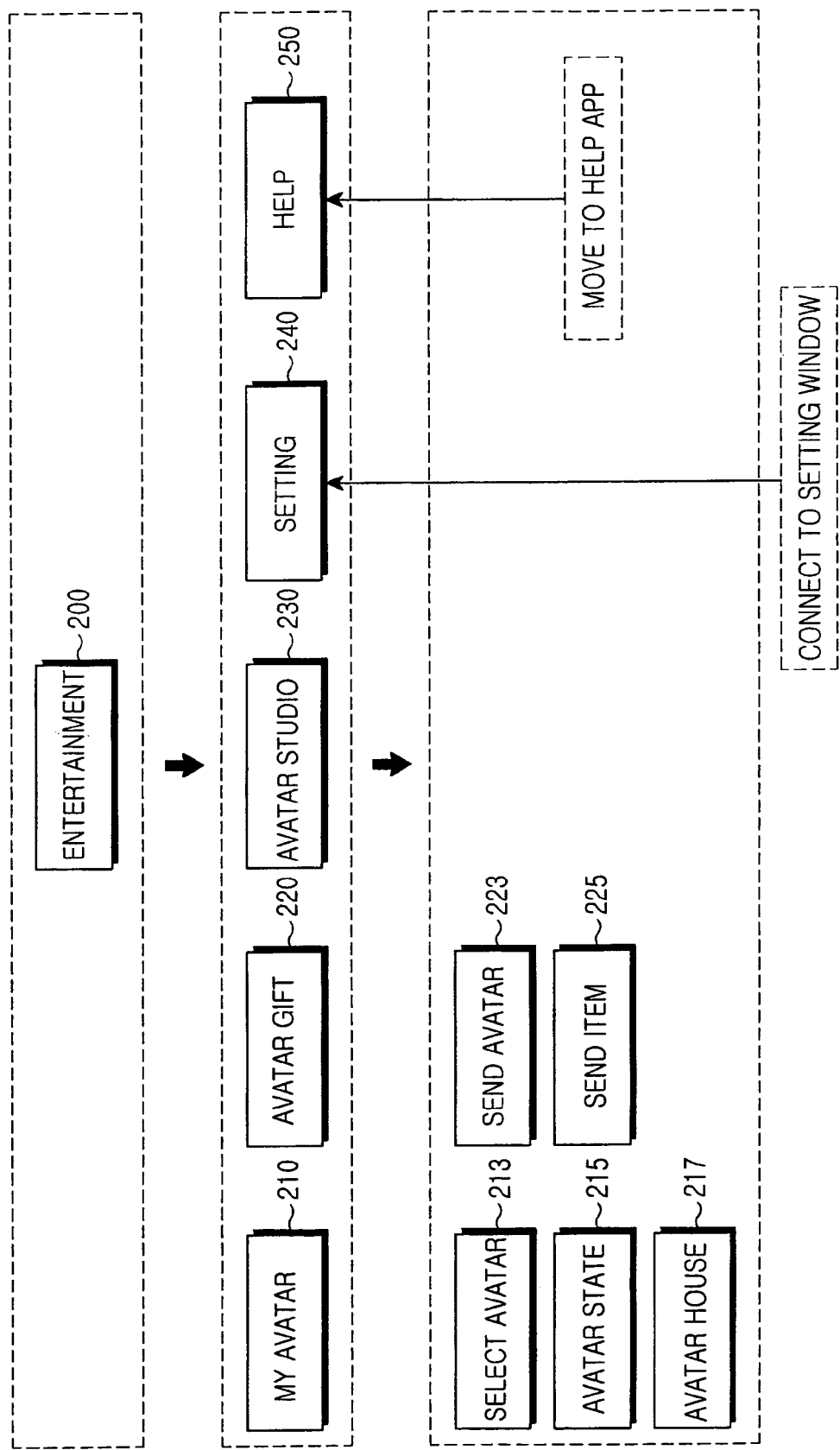
FIG. 2 shows a number of menus for creating a screen image of a mobile terminal according to an embodiment of the present invention.

FIG. 2 shows a number of menus for creating a screen image to be displayed on a mobile terminal according to an embodiment of the present invention.

Referring to FIG. 2, an "entertainment" menu 200 of the mobile terminal contains an "avatar" sub-menu which contains "my avatar 210", "avatar gift 220", "avatar studio 230", "setting 240", and "help 250". Under "my avatar 210", the menus "select avatar 213", "avatar state 215", and "avatar house 217", are listed. Also, under "avatar gift 220", the menus "send avatar 223", and "send item 225" are listed.

Figure 3:
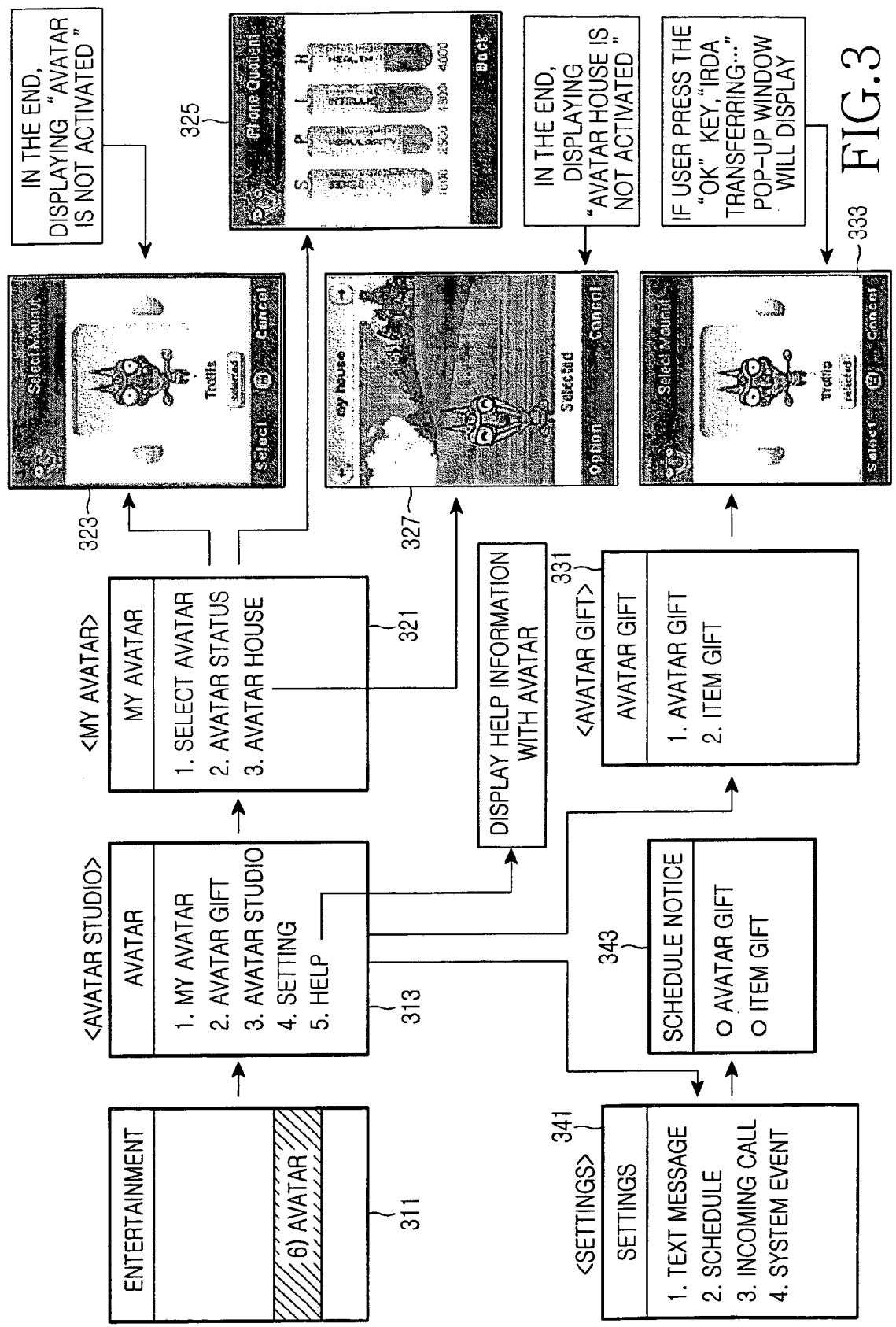
FIG. 3 shows a process of selecting the menus in FIG. 2 to process a screen image according to an embodiment of the present invention.

FIG. 3 shows a process of selecting the menus in FIG. 2 to process a screen image according to an embodiment of the present invention.

Referring to FIGS. 2 and 3, when the "entertainment" menu 200 is selected, the controller 110 displays sub-menus 311 including "avatar" on the display unit 143. When "avatar" is selected from the displayed sub-menus 311, the controller 110 displays sub-menus 313 under the "avatar" on the display unit 143. When "my avatar 210" is selected from the displayed sub-menus 313, the controller 110 displays sub-menus 321 to enable the user to select a desired avatar, preview the emotion state of the avatar, and generate an avatar house image that will be displayed on the display unit 143 in the idle state. When "avatar gift 220" is selected, the controller 110 performs a function to send the avatar and/or items selected by the user from those stored in the memory 130. When "avatar studio 230" is selected, the controller 110 performs a function to combine and process the selected avatar and item images. In "setting 240", the user can select events of the mobile terminal and set a function to inform the user of the occurrence of the selected events using the selected avatar.

More specifically, when "my avatar 210" is selected, the controller 110 detects the selection and displays sub-menus 321 on the display unit 143. When "select avatar 213" is selected from the sub-menus 321, the controller 110 displays avatar images 323 stored in the avatar memory within the memory 130 one by one on the display unit 143 according to the user's pressing of a left/right direction key (not shown) of the key input section 141 so that the user can select one of the avatar images 323. That is, when the user presses the direction key, the controller 110 accesses an avatar image corresponding to the direction key in the memory 130 and displays the corresponding avatar image on the display unit 143. When the user presses an OK key (not shown), the controller 110 recognizes that the currently displayed avatar image is selected and registers the avatar image.

When "avatar state 215" is selected, the controller 110 accesses state information of the avatar in the avatar memory within the memory 130 and displays the information 325 on the display unit 143. Parameters for determining the state of the avatar include any number of variables, such as sensibility, popularity, kindness and fatigue values, that are determined based on the frequency of occurrence of the events of the mobile terminal and which are stored in a specific area of the memory 130. When any event occurs, the parameter values are changed and updated by the values preset for the event which are stored as a table in the memory 130. After processing the occurred event, the controller 110 accesses preset parameter values corresponding to the event in the table stored in the memory 130 and adds those values to the current parameter values, thereby updating the parameter values.

When "avatar house 217" is selected, the controller 110 displays the selected avatar on the display unit 143 and adds subsequently selected items to create an avatar house image. The avatar house image 327 can be used as a screen image displayed on the display unit 143 in the idle state of the mobile terminal. The user can change the locations of the selected avatar and items in the avatar house image or can delete any of the selected items from the avatar house image.

When "avatar gift 220" is selected, the controller 110 displays the sub-menus 331 (i.e., "send avatar 223" and "send item 225") on the display unit 143. When "send avatar 223" is selected, the controller 110 accesses avatar images in the avatar memory within the memory 130 and displays the avatar images 333 on the display unit 143. The avatar images 333 are displayed one by one according to the user's pressing of the left/right direction key. The user can select one of the avatar images by the same method as used in "select avatar 213". When the OK key is pressed, the controller 110 accesses the currently displayed avatar image in the memory 130 and outputs the avatar image to a short range communication unit 150. The short range communication unit 150 modulates the input avatar image using a corresponding short-range communication method and sends the modulated image. The short range communication unit 150 may use any number of communication technologies, such as an IrDA communication technology.

When "send item 225" is selected, the controller 110 accesses items in the item memory within the memory 130 and displays the items on the display unit 143. The user can select an item by the same method as used in "send avatar 223". When the OK key is pressed, the controller 110 accesses the currently displayed item in the memory 130 and outputs the item to the short range communication unit 150.

When "avatar studio 230" is selected, the controller 110 enables the user to combine the selected avatar into a specific image to create a composite image. The specific image may be a photograph. When the user selects a photograph stored in the memory 130, the controller 110 displays the selected photograph on the display unit 143. The user can place the avatar selected in "select avatar 213" at any location on the photograph. When the user presses the OK key, the controller 110 displays a message requesting the input of a title of the composite image on the display unit 143. When the user presses a key to store the composite image, the controller 110 stores the composite image in the memory 130.

When "setting 240" is selected, the controller 110 displays a list of events that the user can be informed of by using an avatar on the display unit 143. If the user selects the desired events and presses the OK key, the controller 110 will register the selected events in the memory 130 so that the user can be informed of the occurrence of the events by the display of the avatar.

FIGS. 4a to 4e show a process of selecting an avatar image and activating an avatar system according to an embodiment of the present invention.

Figure 4A:
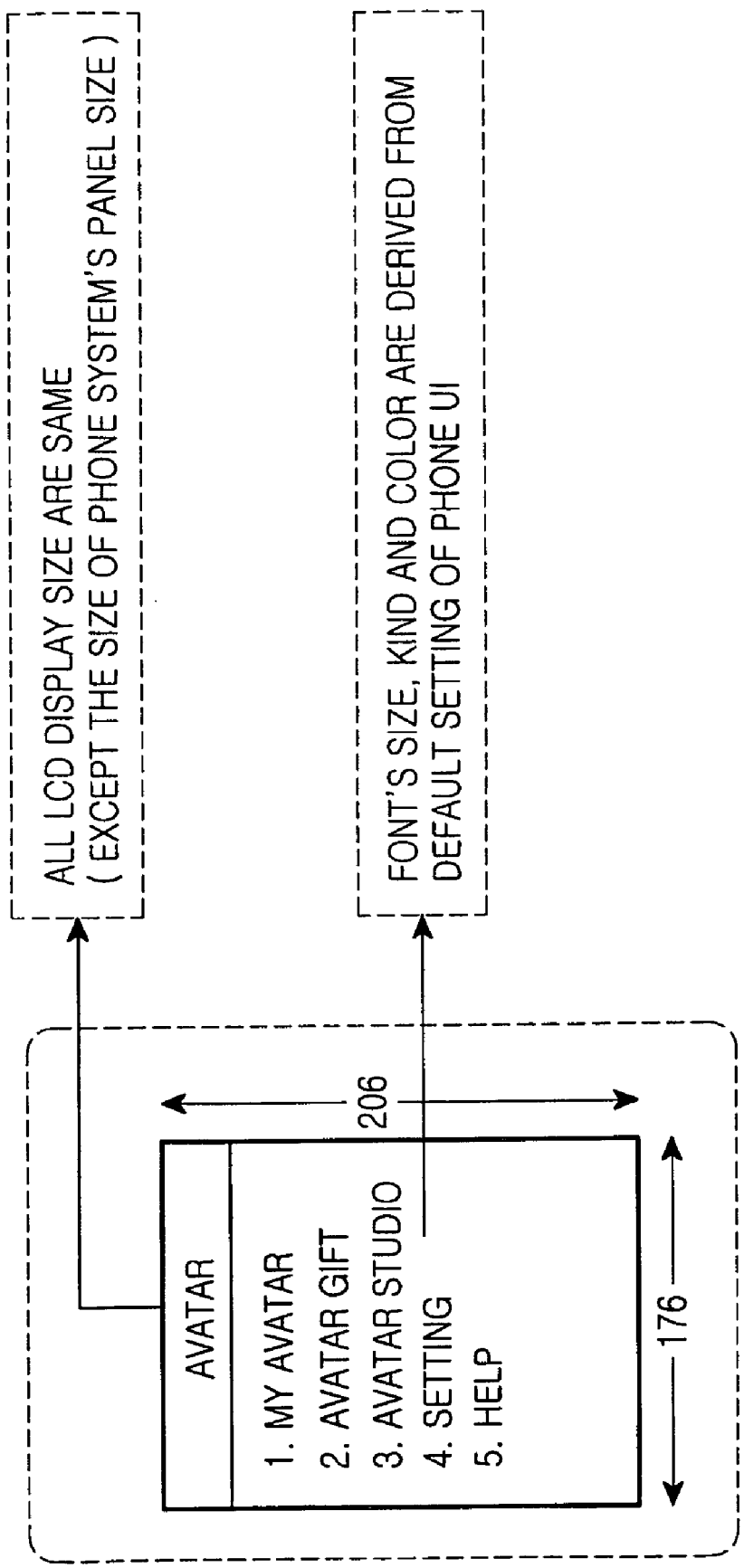
Figure 4B:
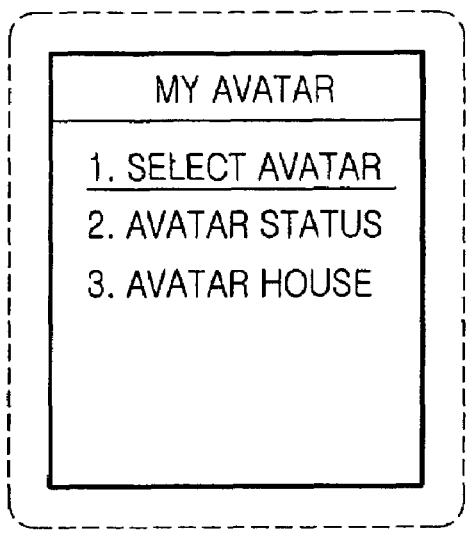

Referring to FIGS. 4a to 4e, when "avatar" is selected from the entertainment menu, sub-menus under "avatar" are displayed on the display unit 143 as shown in FIG. 4a. When "my avatar" is selected from the displayed sub-menus, "select avatar", "avatar status", and "avatar house" items are displayed as shown in FIG. 4b.

Figure 4C:
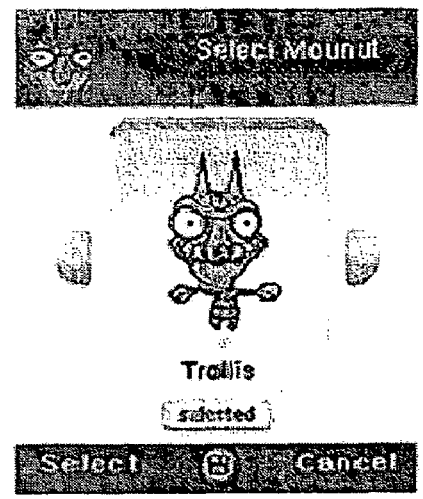
Figure 4D:
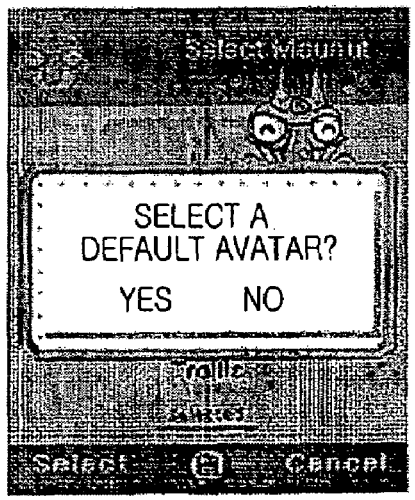
Figure 4E:
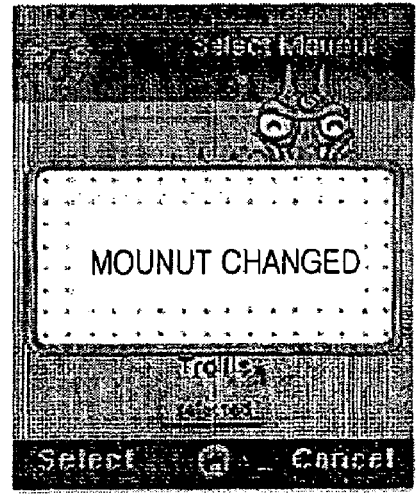

When "select avatar" is selected, the controller 110 displays avatar images in such a manner that the user can scroll through the avatar images as shown in FIG. 4c. While scrolling through the avatar images stored in the avatar memory within the memory 130, the user can press the OK key to select any one avatar. Upon detecting the pressed key, the controller 110 generates a popup window with a question asking whether the selected avatar image should be displayed in the idle state as shown in FIG. 4d. When the user presses the OK key, the controller 110 displays a message informing the user that the selected avatar image has been set as shown in FIG. 4e, and terminates the avatar selection process.

FIGS. 4f to 4h show a process of inactivating the avatar system by selecting "select no avatar" rather than "select avatar 213". The avatar system inactivation refers to a general operation mode without using an avatar.

Referring to FIGS. 4f to 4h, when "avatar" is selected from the entertainment menu, sub-menus under "avatar" are displayed on the display unit 143 as shown in FIG. 4a. When "my avatar" is selected from the displayed sub-menus, "select avatar", "avatar status", and "avatar house" items are displayed as shown in FIG. 4b.

When "select avatar" is selected, the controller 110 displays avatar images. When "select no avatar" is selected in the display as shown in FIG. 4f, the controller 110 generates a popup window on the display unit 143 as shown in FIG. 4g, together with a question asking whether the avatar system should be inactivated. When the user selects Yes, the controller 110 displays a message informing the user that the avatar system inactivation has been set as shown in FIG. 4h, and closes the "select avatar 213" menu. Due to the inactivation of the avatar system, the mobile terminal is then placed in a general operation mode without using an avatar.

Figure 5:
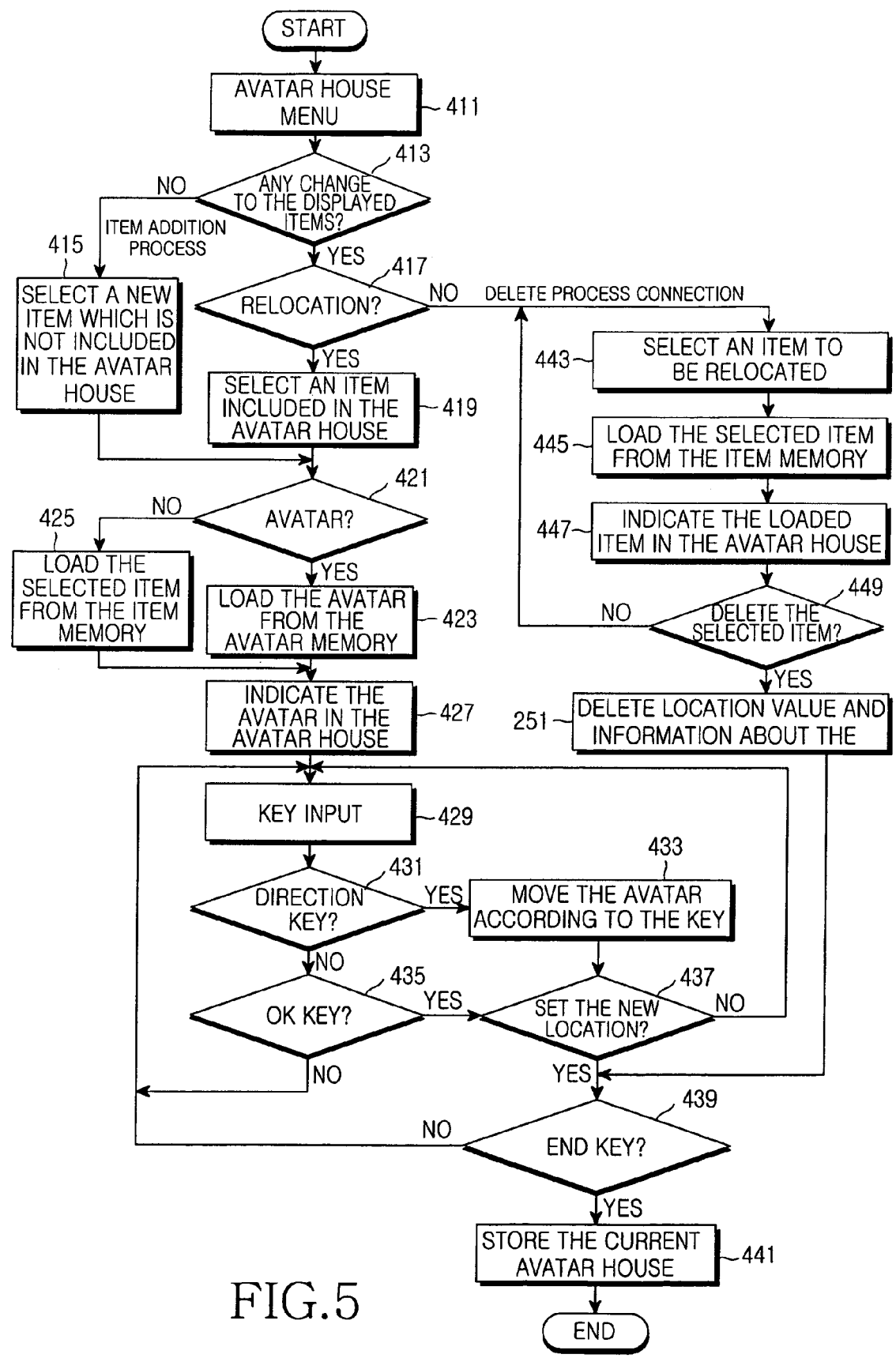
FIG. 5 is a flowchart showing a process of changing the location of a character image in a screen image of a mobile terminal according to an embodiment of the present invention.
Figure 6A:
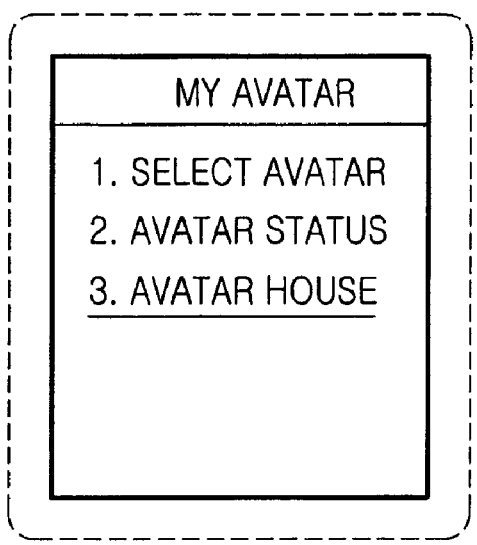
FIGS. 6a to 6c show a process of selecting a background image in a mobile terminal according to an embodiment of the present invention.
Figure 6C:
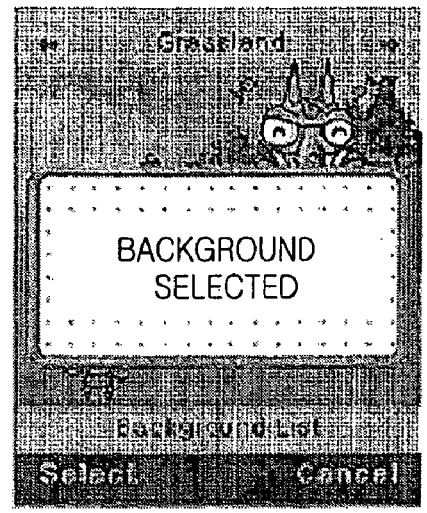
Figure 6B:
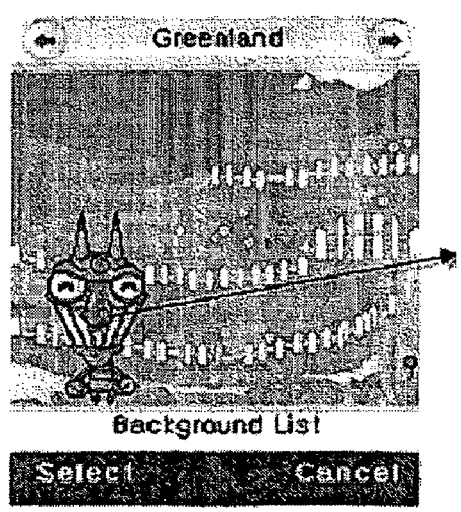
Figure 8A:
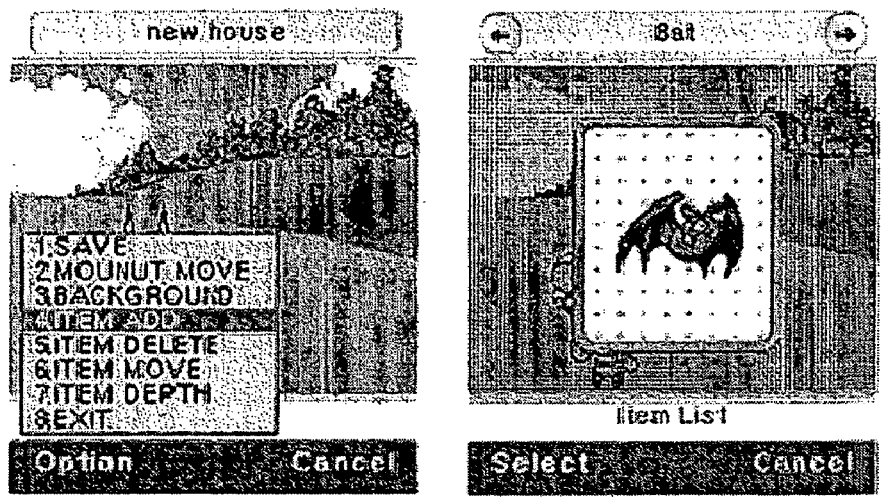
FIGS. 8a to 8c show a process of changing the location of an item in a screen image of a mobile terminal according to an embodiment of the present invention.
Figure 8B:
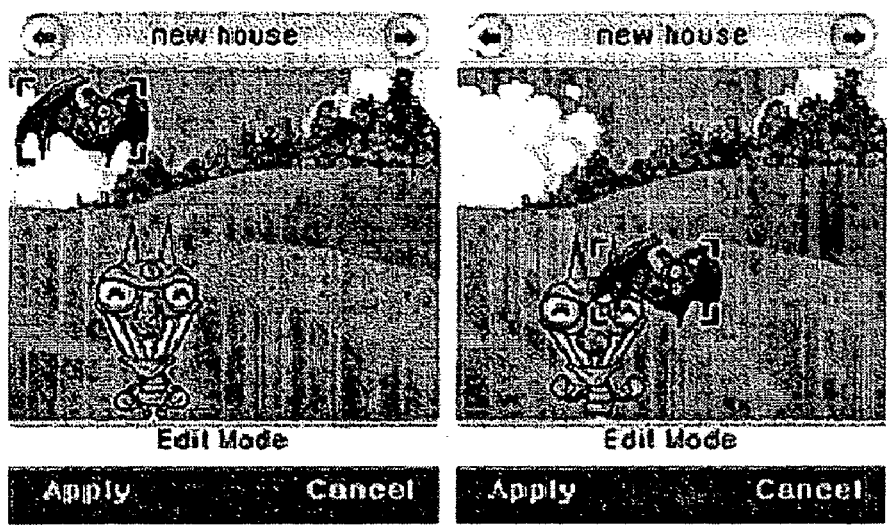
Figure 8C:
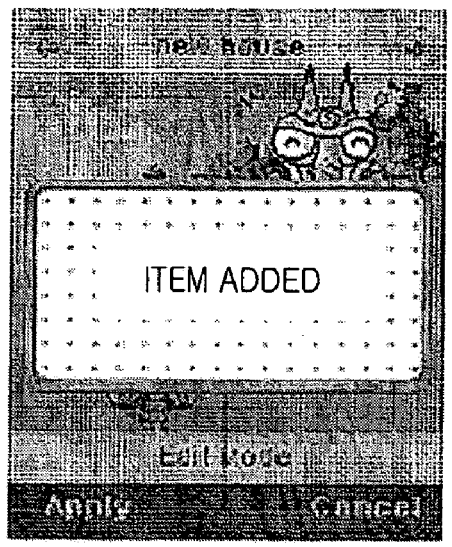
Figure 9:
FIG. 9 shows a screen image displayed on a mobile terminal according to an embodiment of the present invention.

After selecting an avatar, the user can also select items to create a screen image that will be used in the idle state of the mobile terminal. If the user select "avatar house" in the display as shown in FIG. 4b, the controller 110 will perform a process as shown in FIG. 5, through which, the user can select items and set the locations of the selected avatar and items in the screen image displayed on the display unit 143. FIGS. 6a to 6c show a process of selecting a background image in the idle state in FIG. 5, FIGS. 7a to 7d show a process of changing the location of the selected avatar, FIGS. 8a to 8c show a process of changing the location of an item, and FIG. 9 shows an example screen image created through the process of FIG. 5, according to an embodiment of the present invention.

Referring to FIG. 5, when "avatar house" is selected, the controller 110 detects the selection and activates the avatar house menu at step 411. The user can set a background image for the avatar house through a procedure as shown in FIGS. 6a to 6d. Specifically, the user can set a background image under the avatar house menu as shown in FIG. 6a.

When "background setting" is selected, the controller 110 display the number of background images stored in the background memory within the memory 130 and the serial number of each selected background image. In the initial background setting mode, left and right arrows for displaying the background images one by one are displayed as shown in FIG. 6b. When the user presses the OK key, the controller 110 generates a popup window, which includes a question asking whether the selected background image should be set for the avatar house. When the user presses the OK key again, the controller 110 displays a message informing the user that the selected background image has been set for the avatar house as shown in FIG. 6c, and terminates the background setting mode.

In the avatar house menu, the user can change the location of any of the selected avatar and items. In addition, the user can additionally select a new item and insert it to a desired location within the avatar house.

When "addition of item" is selected, the controller 110 detects the selection at step 413, and displays items which are not currently included in the displayed avatar house at step 415. When a new item is selected, the controller 110 detects the selection of the item at step 421, loads the selected item from the item memory within the memory 130 at step 423, and displays the item on the display unit 143 at step 427. The user can move the new item using the direction key. The controller 110 then traces the movement of the new item at steps 429 and 431, and locates the new item in the avatar house according to the movement at step 423. When the user presses the OK key to set the location of the new item, the controller 110 detects the setting at steps 429 to 437, and inserts the new item in the final set location.

When "relocation of avatar" is selected, the controller 110 detects the selection at steps 413, 417, and 419. The controller 110 detects that the avatar is selected to be relocated at step 421, loads the selected avatar from the avatar memory within the memory 130 at step 423, and displays the loaded avatar in the avatar house image at step 427. Through steps 429 to 437, the controller 110 moves the avatar and places the avatar at the new location selected by the user.

When "deletion of item" is selected, the controller 110 detects the selection at steps 413 to 417, and confirms an item selected to be deleted from the avatar house at step 443. The controller 110 loads the selected item from the item memory within the memory 130 at step 445, and highlights the item in the avatar house at step 447. Subsequently, the controller 110 deletes the location value and information about the selected item.

As described above, the user can add a new item, relocate the avatar or an item, or delete any of the images included in the avatar house. The controller 110 stores the changed avatar house with the new added items, the relocated avatars, and without the deleted items. When detecting that an end key is pressed at step 439, the controller 110 stores the screen image (i.e., the avatar house) currently displayed on the display unit in the idle state at step 441 and terminates the avatar house setting mode.

During the process of FIG. 5, the user can select a background image for the screen image (i.e., the avatar house) in the idle state, relocate the avatar or an item, add a new item, or delete any of the displayed items. The process of FIG. 5 will be illustrated in greater detail with reference to FIGS. 7a through 8c.

Referring to FIGS. 6a to 6c, when "avatar house" is selected from the sub-menus displayed on the display unit 143 as shown in FIG. 6a, the controller 110 displays background images which can be scrolled using the direction key as shown in FIG. 6b. At this time, the controller 110 displays each background image to be overlaid with the avatar selected by the user. The controller 110 also displays the number of background images stored in the background memory within the memory 130. The user can select one of the background images using the direction keys as shown in FIG. 6b. When the user presses the OK key, the controller 110 generates a popup window, which includes a question asking whether the selected background image should be set for the avatar house. When the user presses the OK key again, the controller 110 displays a message informing the user that the selected background image has been set for the avatar house as shown in FIG. 6c and terminates the background setting mode.

In the "avatar house" menu, the user can relocate the avatar or an item, add a new item, or delete any of the displayed items.

Figure 7A:
FIGS. 7a to 7d show a process of changing the location of an avatar in a screen image of a mobile terminal according to an embodiment of the present invention.

Referring to FIGS. 7a to 7d, when the avatar house menu is selected, the selected background image with the selected avatar is displayed as shown in FIG. 7a. In addition, soft buttons for the storage of the avatar house (i.e., screen image displayed in a specific state) and the change or addition of background, item, or avatar, are displayed below the image.

Items are divided into general items and special items. In the exemplary embodiment of the present invention, furniture, props, and pets are general items used for interior decoration of the avatar house. That is, an avatar house can be decorated with an avatar, a background, furniture, props, and pets. Special items in the exemplary embodiment of the present invention include a mailbox-shaped icon (or menu) for confirming any received or transmitted text message, a telephone-shaped icon (or menu) for confirming any incoming or outgoing calls, and a camera-shaped icon (or menu) for confirming multimedia data such as photographs. If necessary, additional special items can be set and used as icons (or menus) for performing specific functions in the mobile terminal. In the following description, a mailbox-shaped icon for opening the mailbox and performing a text message function will be explained as one example of a special item.

Figure 7B:
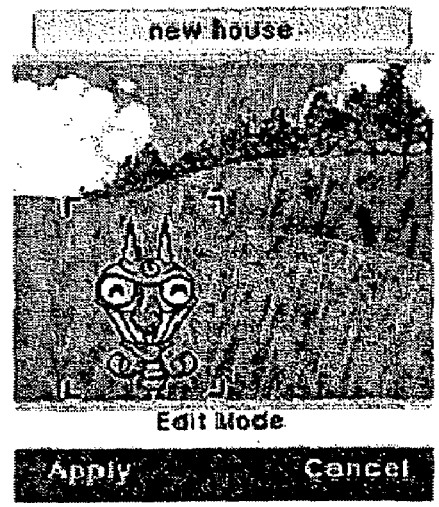
Figure 7C:
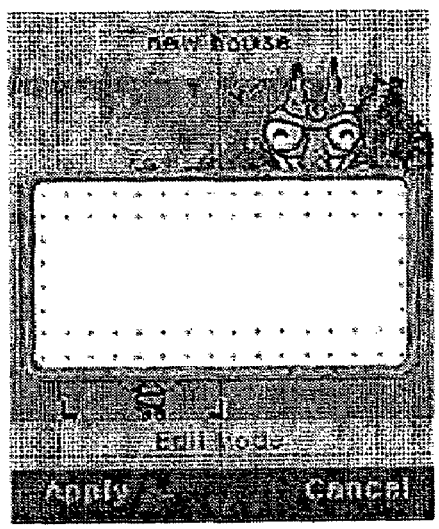
Figure 7D:
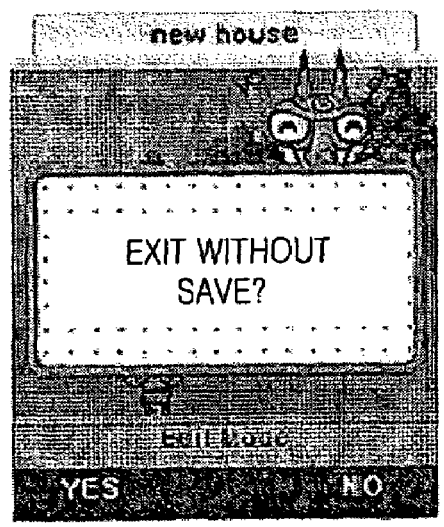

As illustrated in FIGS. 7a and 7b, the items and the avatar can be relocated using the up/down/left/right key (navigation key (not shown)). When the avatar is selected as shown in FIG. 7a, the controller 110 indicates the avatar relocation as shown in FIG. 7b, and enables the user to relocate the avatar using the direction key which can be a navigation key. When the user moves the avatar to a desired new location as shown in FIG. 7b, the user can press the OK key. The controller 110 then detects the new location and displays a popup window for selecting the storage or cancellation of the new location. When the user presses the OK key, the controller 110 displays a message informing the user that the new location of the avatar is being registered as shown in FIG. 7c, and returns to the initial avatar house setting mode. When the user presses the cancel key or exits without saving as shown in FIG. 7d, the controller 110 returns to the mode that displays the sub-menus under "my avatar" as shown in FIG. 4b.

According to FIGS. 7a to 7d, two different menus are used to select the avatar from the displayed avatar house image and relocate the selected avatar. However, it is also possible to use a single menu for both selecting and relocating the avatar in the avatar house image.

Hereinafter, a process of adding a new item and relocating or deleting one of the displayed items will be explained in greater detail with reference to FIGS. 8a to 8c. The user can select a category of items, for example, furniture, props, or pets, using the menu soft button (not shown). The user can then add a new item, or relocate or delete any of the items included in the avatar house. In the item addition mode, the user can add and register an item which is not currently included in the avatar house. In the item relocation mode, the user can move any item included in the avatar house to a desired location. In the item deletion mode, the user can delete any of the items included in the avatar house.

As shown in FIG. 8a, the user can select a category of items using the menu button. When the pet category is selected, the controller 110 displays pet items stored in the memory 130 so that the user can select one using the direction key. For example, when the user selects a bat item from the displayed pet items using the direction key, the controller 110 displays and registers the selected bat item. Subsequently, the controller 110 activates the item relocation mode so that the user can move the new furniture item to a desired location in the avatar house. In that mode, the user can move the bat item up, down, right, or left, to a desired location using the direction key as shown in FIG. 8b in the same manner as used in the avatar relocation. If the user presses the OK key after placing the bat item at the desired location, the controller 110 will detect the key pressing and displays a message informing that the bat item is added to the avatar house as shown in FIG. 8c.

Any other item can be added in the same manner. The controller 110 displays categories of items on the display unit 143. The user can select a new item, for example, a furniture item, through the same process as described above and press the OK key. The controller 110 then generates a popup window on the display unit 143 to enable the user to select addition or cancellation of the new item. According to the user's selection, the controller 110 stores the new item or cancels the addition of the new item.

Hereinafter, a process of deleting an item from the displayed avatar house will be explained in greater detail. The process of deleting an item is similar to the process of adding a new item. The user can select an item to be deleted from the avatar house using the direction key and then press the OK key. The controller 110 detects the selection and deletes the selected item from the avatar house and from the memory 130.

Items are divided into special items that are used to indicate the functions or state of the mobile terminal, and general items that are used to decorate the avatar house. The special items include a mailbox item indicating the arrival of a text message, and a missed call item indicating a missed call. Additional special items include a mailbox item indicating the number of text messages that have not yet been opened, a missed call item indicating the number of missed calls, and a multimedia item indicating the number of multimedia data. In the following description, the mailbox item will be explained as one example of a special item. FIG. 9 shows an example avatar house image (or screen image) created through the process of FIG. 5 according to an embodiment of the present invention. The avatar house image is displayed in the idle state of the mobile terminal.

An avatar house image as shown in FIG. 9 can be used as a screen image displayed in the idle state of the mobile terminal. That is, the avatar house image is picture data displayed from the point of activation of the display unit 143. As shown in FIG. 9, the avatar house image includes general items and special items, and a selected avatar. The avatar included in the avatar house image can express emotion corresponding to the current state of the mobile terminal. Also, the special items included in the avatar house image indicate special events or functions of the mobile terminal. The user can freely decorate the avatar house with various items, thereby creating a unique and distinctive screen image.

Figure 10:
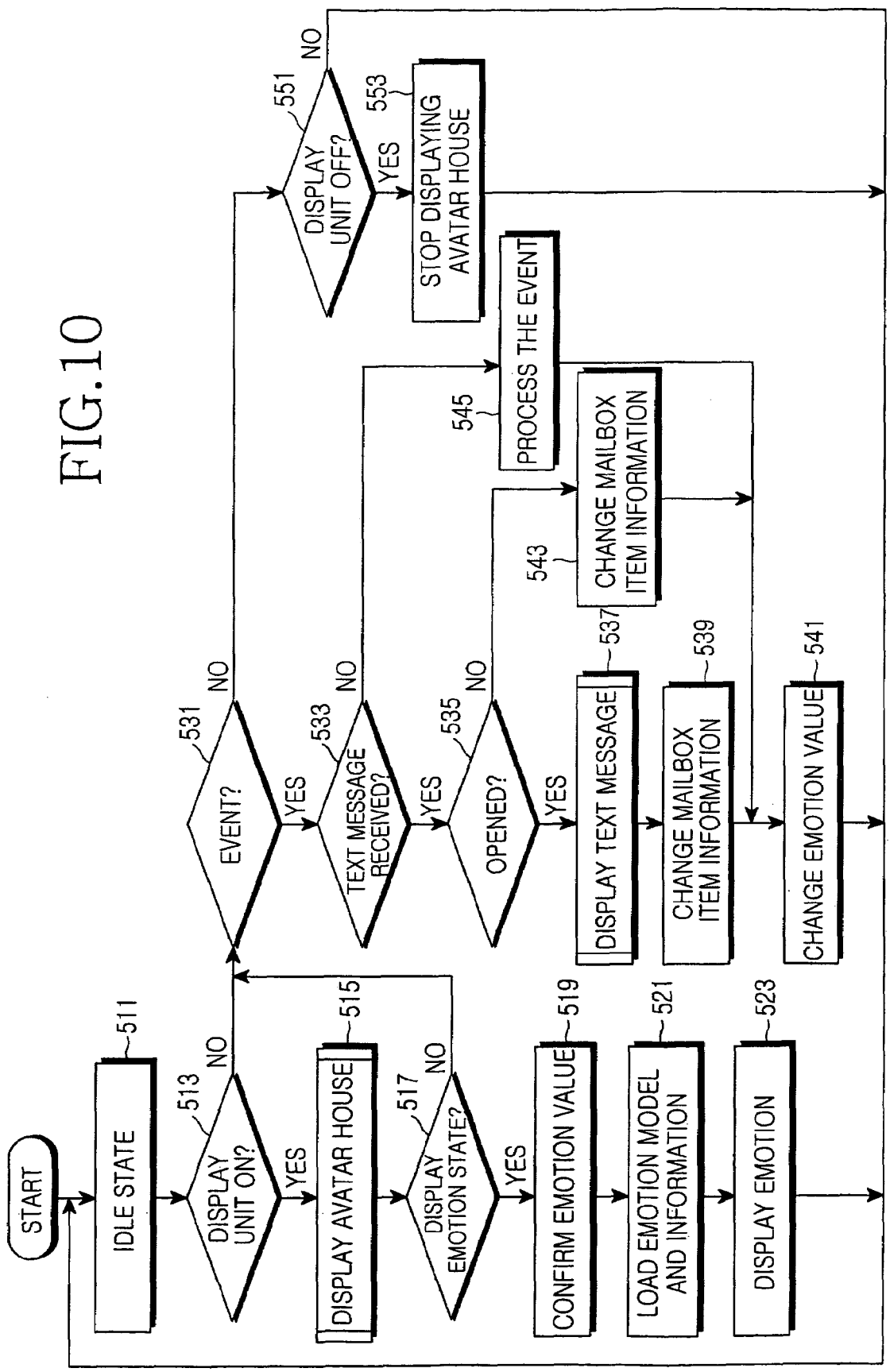
FIG. 10 is a flowchart showing a process of processing an event that has occurred in the idle state and displaying a screen image according to an embodiment of the present invention.

FIG. 10 is a flowchart showing a process of displaying an avatar house image in the idle state of the mobile terminal according to an embodiment of the present invention. The avatar house image specified in FIG. 10 is a screen image displayed in the idle state. The avatar house image can indicate the occurrence of events or the state of the mobile terminal. Particularly, the avatar included in the avatar house image can express the emotion corresponding to the current state of the mobile terminal. The emotion value changes according to the events processed in the mobile terminal.

Referring to FIG. 10, the controller 110 detects whether any event occurs in the idle state at step 511. The idle state at step 511 refers to the waiting mode, without activation of the display unit 143. In the idle state, the controller 110 does not display the avatar house image illustrated in FIG. 9. When a signal for activating the display unit 143 is generated in the idle state, the controller 110 detects the signal at step 513 and displays the avatar house image on the display unit 143 at step 515. For the display of the avatar house image (step 515), the controller 110 performs the process of FIG. 11.

Figure 11:
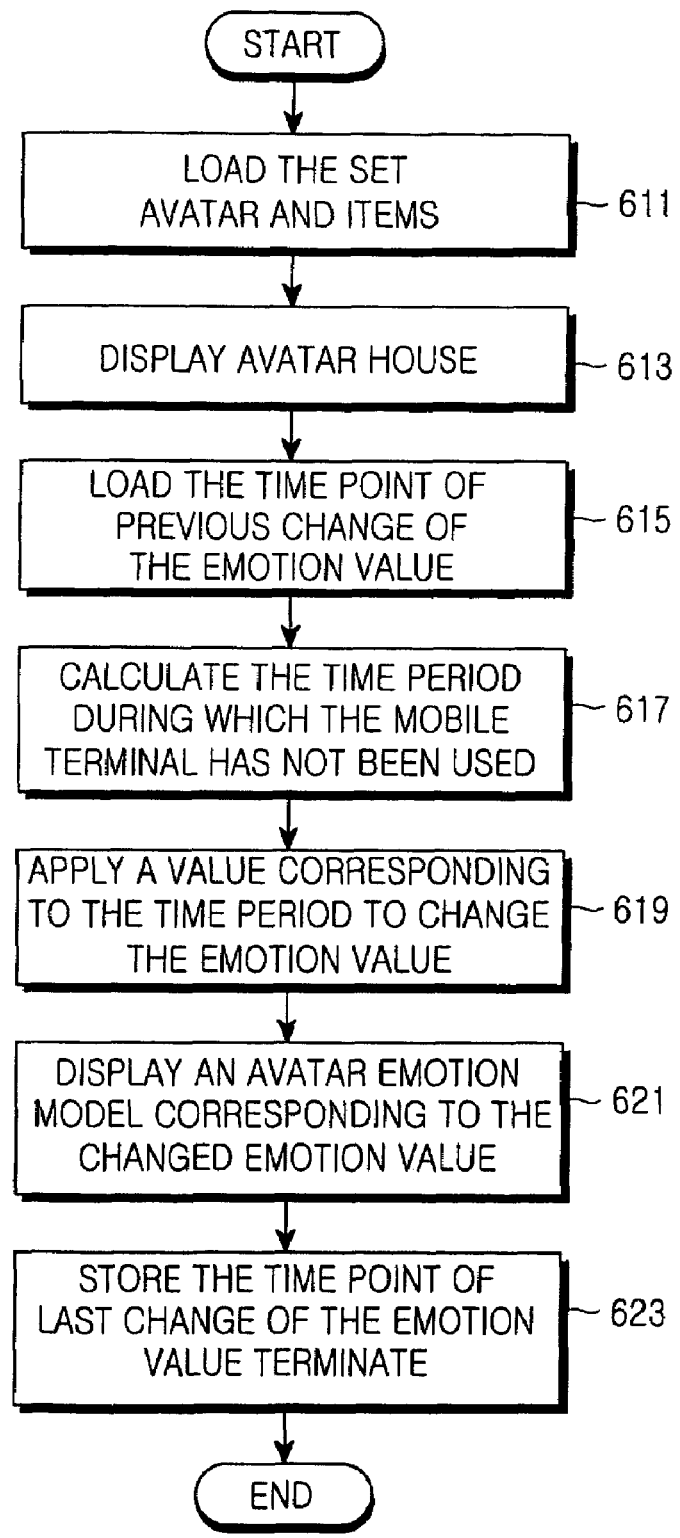
FIG. 11 is a flowchart showing a process of displaying an emotion state on a mobile terminal in the idle state in FIG. 10 according to an embodiment of the present invention.

FIG. 11 is a flowchart showing a process of displaying the avatar house image upon activation of the display unit 143 in the idle state according to an embodiment of the present invention.

Referring to FIG. 11, when a signal for activating the display unit 143 is detected in the idle state, the controller 110 proceeds to step 611 to load the avatar and items set for the avatar house image from the avatar memory and the item memory within the memory 130. The controller 110 then displays the loaded avatar and items in the avatar house image at step 613. An example of the avatar house image with the avatar and items included is shown in FIG. 9.

The controller 110 proceeds with steps 615 to 623 to change the emotion value of the mobile terminal in the idle state. Specifically, when the display unit 143 is activated, for example, when the folder is opened or a key is pressed to operate the display unit 143, the controller 110 reads from the memory 130 the previous time at which the emotion value was changed at step 615, and subtracts the previous time read from the current time, thereby obtaining a time period during which the mobile terminal has not operated at step 617. At step 619, the controller 110 determines whether the time period during which the mobile terminal has not operated is long enough to change the emotion value of the mobile terminal. If the mobile terminal has not operated during a period that is long enough to change the emotion value, the controller 110 will obtain a value corresponding to the time period from Table 1, and will apply the obtained value to the emotion value of the mobile terminal. Subsequently, the controller 110 accesses an emotion model corresponding to the changed emotion value (see Table 1) in the memory 130, and displays the emotion model at the avatar location in the avatar house displayed on the display unit 143. That is, the avatar house displayed in the idle state may include either the avatar which has been set through the process of FIG. 5, or an emotion model of the avatar which has been accessed in the memory as an image corresponding to the current emotion value of the mobile terminal.

At step 623, the controller 110 stores the changed emotion value together with the time at which the emotion value has last been changed. The controller 110 obtains a time period during which the mobile terminal has stayed in the idle state at the time when the display unit 143 is on, and uses the time interval as a parameter for reducing the emotion value of the mobile terminal.

In an exemplary embodiment of the present invention, the controller 110 displays the avatar house through steps 611 to 613, and applies any emotion variance value to change the emotion value through steps 615 to 619. Subsequently, the controller 110 accesses and displays an avatar emotion model corresponding to the changed emotion model at step 621, thereby completing the display of the avatar house in the idle state. However, it is also possible to skip step 621 so as not to include the emotion model in the avatar house displayed in the idle state. Although FIG. 11 shows a process that first displays the avatar house and then applies an emotion variance value to change the emotion value and display a corresponding emotion model, it is also possible to first change the emotion value based on the emotion variance value and then display the avatar house with the changed emotion value applied.

FIGS. 13c to 13g show avatar emotion models corresponding to the emotion value classes specified in Table 2. FIG. 13c shows an emotion model of the highest emotion value class, whereas FIG. 13g shows an emotion model of the lowest emotion value class. The avatar emotion models in FIGS. 13c to 13g can be included in the avatar house according to the emotion state of the mobile terminal.

Figure 12A:
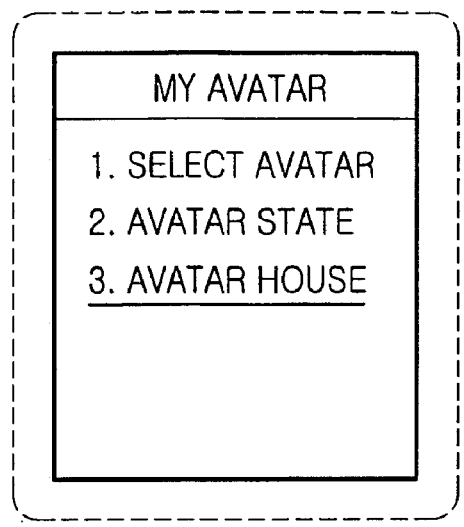
FIGS. 12a and 12b show a process of confirming an emotion state in the idle state of a mobile terminal according to an embodiment of the present invention.
Figure 12B:
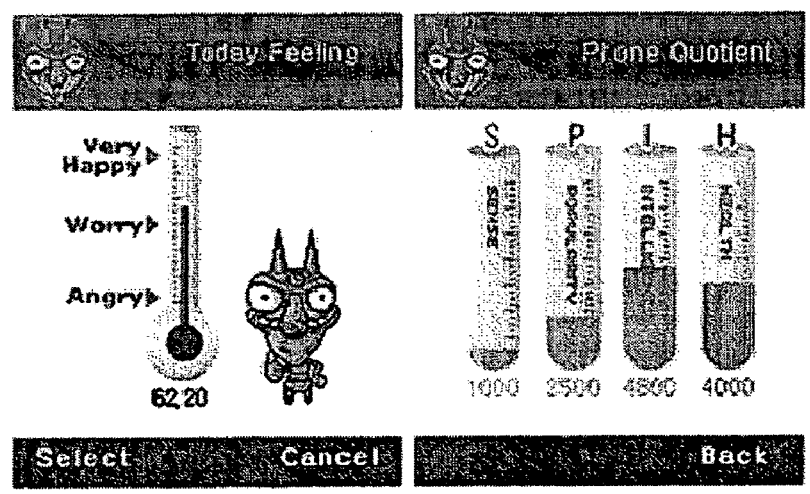

In the idle state, the user can confirm the current emotion value of the mobile terminal. FIGS. 12a and 12b show a process of confirming the current emotion value of the mobile terminal in the idle state according to an embodiment of the present invention. When "my avatar" is selected from the avatar menu, the controller 110 displays the sub-menus as shown in FIG. 12a. Returning to FIG. 10, when "avatar state" is selected from the displayed sub-menus, the controller 110 detects the selection at step 517 and proceeds with steps 519, 521, and 523 to display the current emotion state of the mobile terminal on the display unit 143 as shown in FIG. 12b. That is, when the user presses a key to confirm the current emotion state, the controller 110 confirms the current emotion value from the memory 130 at step 519, and displays the confirmed emotion value and corresponding emotion state on the display unit 143 at step 523 as shown in FIG. 12b.

Alternatively, the controller 110 may access an emotion model corresponding to the current emotion state and display the emotion model on the display section 143. In addition, the controller 110 may periodically display, at predetermined time intervals, an avatar making a gesture that is accompanied by a word balloon speaking the emotion state of the mobile terminal. For example, an avatar expressing the emotion state through a corresponding gesture and a word balloon can be displayed twice a day (every twelve hours).

The avatar house set as shown in FIG. 13a keeps on displaying the emotion state of the mobile terminal. Accordingly, the user can confirm the emotion state through the gesture of the avatar in the avatar house displayed in the idle state. When a previously set time for displaying the emotion state is reached, the controller 110 detects it at step 517 and confirms the current emotion value of the mobile terminal at step 519. At step 521, the controller 110 loads emotion information on which an avatar emotion model is based, such that the avatar emotion model corresponding to the current emotion value and a word balloon can then be displayed. At step 523, the controller 110 displays an avatar emotion model and a word balloon as shown in FIG. 13b. The avatar emotion model can be one of the avatar animations as shown in FIGS. 13c to 13g. The emotion information corresponding to the avatar emotion model can be obtained from the current emotion value of the mobile terminal as shown in Table 2. Table 3 below shows emotion information corresponding to the avatar emotion models in FIGS. 13c to 13g (i.e., emotion states that can be expressed in a word balloon).

TABLE 3

| Status | Text Data |
| --- | --- |
| Special | R. O. T. F. L. M. A. O! |
|  | I'm so psyched! |
| Happy | It's weird. I'm really having a good day! |
|  | Wow, this is so cool! |
| Shy | I'm bored out of my mind. |
|  | Is there nothing to do today? |
| Sad | No way . . . :( I can't believe it . . . |
|  | I'm gonna cry . . . :( |
| Angry | This sucks! |
|  | This day sucks! Worst day of my life! |

The current emotion state of the mobile terminal can be displayed as shown in FIG. 12b. Alternatively, an avatar emotion model corresponding to the current emotion state and value can be displayed together with a word balloon expressing the emotion state as shown in FIG. 13b.

As described above, the mobile terminal can display the current emotion state using an avatar emotion model in an avatar house displayed in the idle state. A first method of displaying the emotion state is to confirm the emotion value of the mobile terminal at the time when the display unit 143 is on, and display an avatar emotion model corresponding to the confirmed emotion value. A second method of displaying the emotion state is to display the current emotion state and value of the mobile terminal as shown in FIG. 12b upon the user's selection of menus for confirming the emotion state. A third method of displaying the emotion state is to periodically confirm the emotion value of the mobile terminal at predetermined time intervals, access an avatar emotion model and emotion information corresponding to the confirmed emotion value, and display the avatar emotion model with a word balloon as shown in FIG. 3b.

Returning to FIG. 10, events may occur in the idle state of the mobile terminal when the display unit 143 is activated or inactivated. These events can include all of the operations of the mobile terminal, including those specified in Table 1. When an event occurs, the controller 110 determines whether the event is the arrival of a text message. If not, the controller 110 will process the event at step 545, and will change the emotion value by an emotion variance value corresponding to the event at step 541. The controller 110 will also store the time at which the emotion value was changed in the memory 130 and will return to the idle state. Event examples that may change the emotion value are specified in Table 1. When any other event which is not specified in Table 1 occurs, the controller 110 simply returns to the idle state, without changing the emotion value as in step 541.

If the event is the arrival of a text message, the controller 110 detects the event at step 533, and processes the event according to the user's selection through steps 537 to 543. The emotion value of the mobile terminal can be changed according to the number of received text messages.

When a text message is received, the controller 110 detects it at step 533, and increases the mailbox value, which is displayed within the avatar house to indicate the number of received text messages, by one at step 543. That is, when a text message is received, the controller 110 changes the mailbox information in the avatar house to indicate the total number of received text messages which have not yet been opened. Subsequently, at step 541, the controller 110 changes the current emotion value by an emotion variance value corresponding to the arrival of a text message (see Table 1).

Thus, the user can confirm the number of unopened text messages through the mailbox item in the avatar house that is displayed on the display unit 143 in the idle state. When the user clicks on the mailbox item or selects a menu for opening a received message, the controller 110 detects it at step 535, and displays the received text message on the display unit 143 at step 537.

When the folder is closed in a state wherein the avatar house is displayed, or when a predetermined time for displaying the avatar house lapses, the controller 110 recognizes that the display unit 143 is off at step 551, and terminates the display of the avatar house on the display unit 143 at step 553.

According to the embodiments of the present invention, an avatar house decorated with an avatar and items can be displayed as a screen image in the idle state of the mobile terminal, which improves the display efficiency of the mobile terminal. The mobile terminal includes an avatar memory for storing avatar emotion models corresponding to different emotion values of the mobile terminal. When an event occurs, the mobile terminal changes the current emotion value by a variance value corresponding to the event. In the idle state, the mobile terminal displays the avatar house including an avatar emotion model corresponding to the changed emotion value, thereby providing effective visual display of the status of the mobile terminal. Items that can be displayed in the idle state consist of general items used to decorate the avatar house and special items used to indicate specific functions or events of the mobile terminal. The special items can visually inform the user of any event occurring in the mobile terminal.

Although a number of exemplary embodiments of the present invention have been described for illustrative purposes, those skilled in the art will appreciate that various modifications, additions, and substitutions are possible, without departing from the scope and spirit of the invention as disclosed in the accompanying claims, including the full scope of equivalents thereof.

What is claimed is:

1. A mobile terminal capable of displaying a screen image during a specific state, which comprises:
    a character memory for storing at least one category of character images and a screen image created by a combination of the character images, and wherein the screen image is displayable during a specific state of the mobile terminal;
    a controller for processing a plurality of simultaneous events, wherein each is assigned a variance value within a plurality of applications and based upon a cumulative variance value, controlling a display of a character image of the screen image stored in the character memory during the specific state; and
    a display unit for displaying the screen image.

2. The mobile terminal as claimed in claim 1, wherein said specific state comprises an idle state of the mobile terminal.

3. The mobile terminal as claimed in claim 2, wherein:
    said character memory is configured to store a plurality of item images for inclusion in the screen image, a plurality of background images for inclusion as a background of the screen image and the screen image composed of one or more item images, and a background image to be displayed during the specific state of the mobile terminal.

4. The mobile terminal as claimed in claim 3, wherein:
    said character memory is further configured to store at least one avatar image for inclusion in the screen image, wherein each avatar image comprises emotion models that express emotion states.

5. The mobile terminal as claimed in claim 4, wherein said item images comprise special items used to indicate specific events of the mobile terminal and general items.

6. The mobile terminal as claimed in claim 5, wherein said special items comprise at least one of a mailbox item used to indicate arrival of a text message and a missed call item to indicate a missed call.

7. The mobile terminal as claimed in claim 6, wherein said controller is configured to reduce an indicated number of text messages that have not yet been opened when a text message is opened.

8. The mobile terminal as claimed in claim 4, wherein said character memory comprises:
    an avatar memory for storing at least one emotion model for each avatar image; and
    an emotion variance value memory for storing emotion variance values of the respective events of the mobile terminal,
    wherein said controller is configured to confirm an emotion variance value of an event in the emotion variance value memory when processing the event, apply the emotion variance value to the current emotion value of the mobile terminal, determine an emotion model corresponding to the changed emotion value, access the emotion model in the avatar memory, and add the emotion model to a preset location in the screen image.

9. The mobile terminal as claimed in claim 8, wherein said character memory further comprises:
    an avatar memory for storing at least one avatar image;
    an item memory for storing items for inclusion in a screen image;
    a background memory for storing background images for inclusion as a background of the screen image; and
    a screen image memory for storing a screen image created by a combination of an avatar and items with a background image.

10. The mobile terminal as claimed in claim 9, wherein said specific state comprises an idle state of the mobile terminal.

11. The mobile terminal as claimed in claim 10, wherein:
    said controller is configured to display avatar images stored in the avatar memory on the display unit in an avatar selection mode; and
    said controller is further configured to register an avatar image selected by a user to be included in the screen image, register items selected in an item selection mode to be included in the screen image, relocate the registered avatar or items according to the input of a direction key, and set the screen image.

12. A method for displaying a screen image during a specific state of a mobile terminal having a character memory for storing at least one category of character images and a screen image created by a combination of the character images, which comprises the steps of:
    processing a plurality of simultaneous events, wherein each is assigned a variance value within a plurality of applications occurring in a mobile terminal and based upon a cumulative variance value, changing display data of a character image of a screen image stored in a character memory according to the event processing result; and
    displaying the changed screen image during a specific state of the mobile terminal.

13. The method as claimed in claim 12, wherein said specific state comprises an idle state of the mobile terminal.

14. The method as claimed in claim 13, wherein said screen image comprises at least one item image and a background image used as a background of the screen image.

15. The method as claimed in claim 14, wherein said item images comprise special items used to indicate specific events of the mobile terminal and general items, and wherein said step of displaying the screen image includes indicating the occurrence of an event by a corresponding special item.

16. The method as claimed in claim 15, wherein said corresponding special item comprises a mailbox item used to indicate arrival of a text message.

17. The method as claimed in claim 15, wherein said corresponding special item comprises a telephone-shaped item used to indicate a missed call.

18. The method as claimed in claim 14, wherein said screen image further comprises at least one avatar image having a plurality of emotion models to express emotion, and wherein said steps of processing an event and displaying the screen image include:
  confirming an emotion variance value of the event in the emotion variance value memory;
  applying the emotion variance value to the current emotion value of the mobile terminal;
  determining an emotion model corresponding to the changed emotion value; and
  accessing the emotion model in the avatar memory and adding the emotion model to a preset location in the screen image.

19. The method as claimed in claim 12, further comprising the step of setting the screen image which includes:
  displaying avatar images stored in the character memory and registering an avatar image selected by a user to be included in the screen image in an avatar selection mode;
  registering items selected by the user to be included in the screen image in an item selection mode; and
  relocating the registered avatar or items according to the input of a direction key in a relocation mode.

20. A method for displaying a screen image on a mobile terminal having a character memory for storing the screen image which is comprised of special items indicating specific events of a mobile terminal and general items, the method comprising the steps of:
  displaying the screen image in an idle state;
  processing a plurality of simultaneous events, wherein each is assigned a variance value within a plurality of applications occurring in a mobile terminal when the event occurs, indicating the event in a corresponding special item, and based upon a cumulative variance value, changing the display data of the screen image according to the event processing result; and
  returning to the idle state and displaying the changed screen image.

21. The method as claimed in claim 20, wherein said corresponding special item comprises a mailbox item used to indicate arrival of a text message with a total number of text messages that have not yet been opened.

22. The method as claimed in claim 21, wherein said mailbox item indicates a reduced number when the received text message is opened.

* * * * *